(12) United States Patent
Thomas

(10) Patent No.: US 8,695,468 B2
(45) Date of Patent: Apr. 15, 2014

(54) LOCKING ASSEMBLY FOR A POWER MITER SAW

(75) Inventor: Adam S. Thomas, Aurora, IL (US)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 11/978,846

(22) Filed: Oct. 30, 2007

(65) Prior Publication Data

US 2009/0107316 A1  Apr. 30, 2009

(51) Int. Cl.
  *B23D 33/02* (2006.01)
(52) U.S. Cl.
  USPC ............. 83/471; 83/471.3; 83/490; 83/491; 83/581
(58) Field of Classification Search
  USPC ........ 83/471.3, 581, 490, 477, 477.1, 698.51, 83/454, 657, 471, 491; 269/77, 85, 82, 60, 269/74, 89; 403/60
  See application file for complete search history.

(56) References Cited

U.S. PATENT DOCUMENTS

| | | | | |
|---|---|---|---|---|
| 1,596,856 | A | * | 8/1926 | Setlow ........................... 411/75 |
| 3,528,691 | A | * | 9/1970 | Matich, Jr. .................... 403/356 |
| 3,574,315 | A | | 4/1971 | Boultinghouse |
| 3,593,601 | A | * | 7/1971 | McFarland .................... 81/447 |
| 3,821,918 | A | | 7/1974 | Niehaus et al. |
| 4,846,036 | A | * | 7/1989 | Metzger et al. ................ 83/438 |
| 5,244,133 | A | * | 9/1993 | Abbott et al. ................. 224/521 |
| 5,595,124 | A | | 1/1997 | Wixey et al. |
| 6,024,352 | A | * | 2/2000 | Albrecht ....................... 269/244 |
| 6,431,042 | B1 | | 8/2002 | Brault et al. |
| 6,474,206 | B1 | | 11/2002 | Brunson |
| 6,513,412 | B2 | | 2/2003 | Young |
| 6,779,428 | B2 | * | 8/2004 | Kao ................................ 83/469 |
| 6,810,780 | B2 | | 11/2004 | Ceroll et al. |
| 7,444,913 | B2 | * | 11/2008 | Shibata et al. ................. 83/446 |
| 2001/0001375 | A1 | * | 5/2001 | Meredith et al. ............. 83/471.3 |
| 2004/0060412 | A1 | | 4/2004 | Kao |
| 2005/0262984 | A1 | * | 12/2005 | Hetcher et al. .............. 83/471.3 |
| 2006/0000331 | A1 | * | 1/2006 | Ozawa et al. ................ 83/471.3 |
| 2009/0315237 | A1 | * | 12/2009 | Thomas et al. ................ 269/63 |

FOREIGN PATENT DOCUMENTS

| | | |
|---|---|---|
| CN | 1721111 | 1/2006 |
| DE | 20 2007 001945 | 7/2008 |
| EP | 0588515 | 3/1994 |
| EP | 1 618 981 | 1/2006 |
| EP | 1818127 | 8/2007 |

* cited by examiner

*Primary Examiner* — Omar Flores Sanchez

(74) *Attorney, Agent, or Firm* — Maginot, Moore & Beck

(57) ABSTRACT

Embodiments of the present invention include a locking assembly for a power miter saw of the type which has a base and a table that is rotatably mounted on the base about a center pivot axis, comprising a pair of oppositely facing arcuate surfaces on the base spaced from and being concentric with the center pivot axis, a clamp attached to the table for engaging the arcuate surfaces to lock the table from rotating relative to the base by applying a clamping force to the arcuate surfaces and not to the center pivot axis, and an actuating mechanism for operating the clamp.

23 Claims, 15 Drawing Sheets

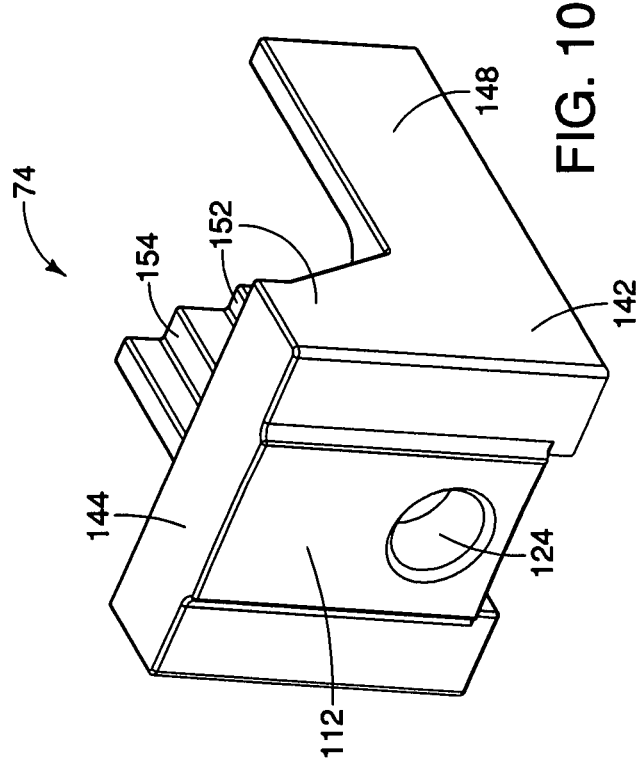
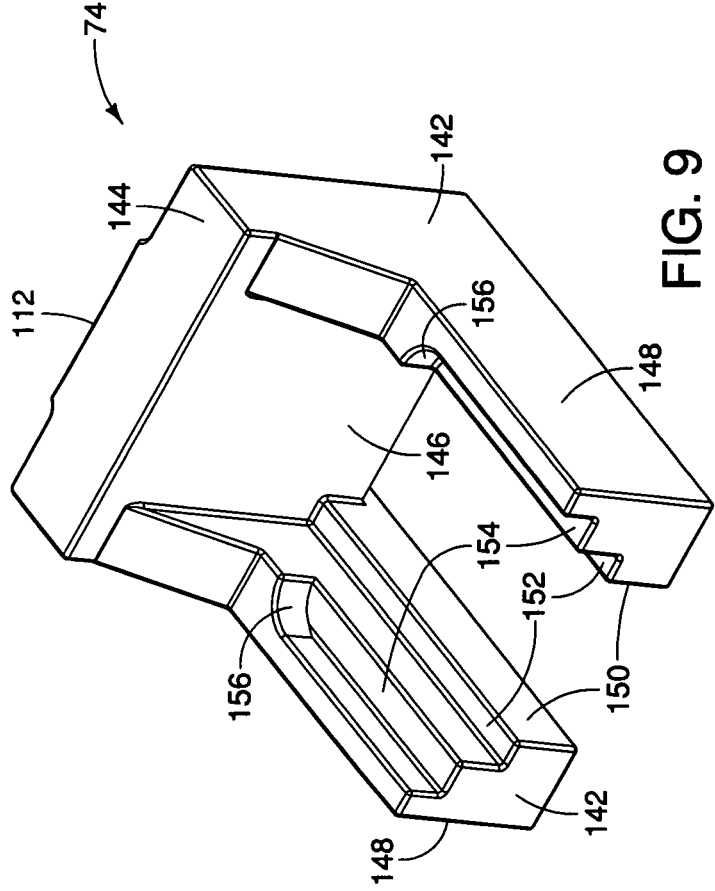

US 8,695,468 B2

LOCKING ASSEMBLY FOR A POWER MITER SAW

BACKGROUND OF THE INVENTION

The present invention generally relates to power tools that have a table that is rotatable on a base, and more particularly to a locking assembly for locking the table.

Power miter saws have long been used to cut work pieces such as trim, molding and the like where precise angled cuts are made. Such miter saws generally have a base on which a rotatable table is mounted, the table being adjustable around a center pivot axis. A user can adjust the angle of the table relative to a fence, and a blade and motor assembly is generally attached to the table and can be lowered into a cutting position. It is common for the table to have angular indicia so that a user can quickly rotate the table to a desired angular position so that cuts can be made.

Such miter saws have detents for commonly used angular positions such as 22½°, 45°, as well as others, and also have locking mechanisms for locking the table in a preferred predetermined position.

All known miter saw locks have at least one of three undesirable characteristics. First, locking the miter angle can cause the table itself to bend, which can detrimentally affect the accuracy of miter cuts made by the saw. Second, locking the table can cause the preset miter angle to move, which can also affect the accuracy of the cut. Third, locking the table may cause the top surface of the table to go out of plane relative to the base. Any one of the three characteristics can have an adverse effect on the quality of the cuts made by the miter saw.

With regard to the characteristic of the table bending, the location of the opposing forces that are produced during the locking action is the main cause of this. Moving the locking mechanism components closer to one another by reducing the span on the table can effectively reduce this characteristic. With regard to the miter angle movement, it is a common characteristic of many locking mechanisms to lock the miter angle by turning the screw against a stationary wall. This can cause the miter angle to move as the screw tightens. Tightening the lock knob will generally cause the table to rotate slightly in the counterclockwise direction, which can detrimentally affect precision cuts. An acceptable solution to overcome this characteristic is to have the screw tighten against an intermediate piece, which is effective if the piece is not allowed to rotate. Other designs have addressed this problem by using linkages and cams instead of screws to lock the miter angle.

With regard to the out of plane table movement, there are no known locking assemblies that effectively address this problem or characteristic. All known miter lock designs utilize the pivot point of the table to the base to provide the opposing force when the miter locking assembly is engaged. For a freely moving pivot connection, there must be clearances in the pivot joint. When the miter lock assembly is engaged, the pivot joint is pushed to one side of the clearance, and that causes the table to move out of plane, relative to the base.

SUMMARY OF THE INVENTION

Embodiments of the present invention include a locking assembly for a power miter saw of the type which has a base and a table that is rotatably mounted on the base about a center pivot axis, comprising a pair of oppositely facing arcuate surfaces on the base spaced from and being concentric with the center pivot axis, a clamp attached to the table for engaging the arcuate surfaces to lock the table from rotating relative to the base by applying a clamping force to the arcuate surfaces and not to the center pivot axis, and an actuating mechanism for operating the clamp.

DESCRIPTION OF THE DRAWINGS

FIG. 9 is a perspective view of the non-threaded jaw component of the first preferred embodiment of the locking assembly;

FIG. 10 is another perspective view of the non-threaded jaw component of the first preferred embodiment of the locking assembly;

DETAILED DESCRIPTION OF THE PREFERRED EMBODIMENTS

Broadly stated, the present invention is directed to several preferred embodiments of a locking assembly for a power miter saw of the type which has a base and a table that is rotatably mounted on the base about a center pivot axis. The locking assembly embodiments comprise floating, parallel clamping mechanisms which are preferably provided on the rotatable table, that interact with a base to lock the table in a particular miter angle, with the locking assembly experiencing none of the undesirable characteristics or problems that have been previously described. By having two clamping surfaces that interact with a cooperative structure on the base, the floating, parallel clamping mechanism which has two clamping surfaces, isolate the locking forces to the clamp itself. Stated in other words, there are virtually no forces that are transferred to the pivot axis of the interconnection between the table and the base, which eliminates any out of plane movement when the locking assembly is engaged. Bending of the table is also eliminated, because the forces are concentrated over a very short span.

Figure 1:
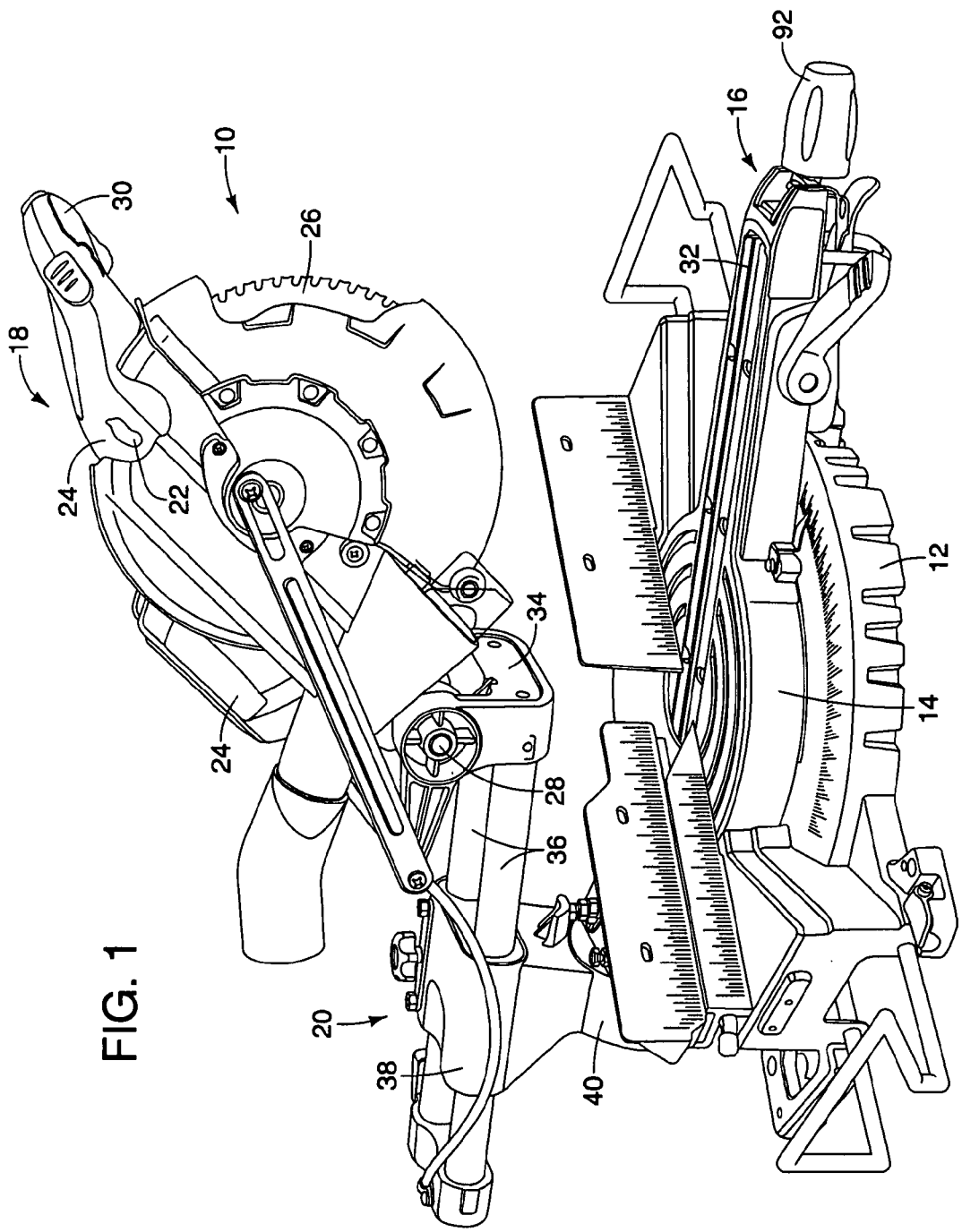
FIG. 1 is a left front perspective view of a power miter saw which incorporates a first preferred embodiment of the present invention, and is shown with portions broken away to show a motor in a motor housing.

Turning now to the drawings, and particularly FIG. 1, a miter saw, indicated generally at 10, has a base 12 with a generally circular portion on which a rotatable table 14 is attached. A miter arm control assembly, indicated generally at 16, is either integrally formed with the rotatable table 14 or is attached to it and is provided for adjusting the horizontal angular position of the table 14 for setting the miter angle for cutting a work piece that would be placed on the table 14.

A saw blade and motor assembly, indicated generally at 18, is operatively connected to the table 14 by a linear guide mechanism, indicated generally at 20. The saw blade and motor assembly 18 has an electric motor 22 that is operatively connected through a gear mechanism that drives a saw blade 26, the gear mechanism not being shown but located within a housing portion 24. The blade and motor assembly 18 is pivotable about a horizontal shaft 28. A handle 30 is provided for use by an operator to bring the blade and motor assembly 18 from a rest position shown in FIG. 1 where it is elevated relative to the table to a lowered cutting position if a work piece is placed on the table 14.

The miter arm control assembly 16 has a slot 32 that extends to the table 14 and enables the blade 26 to be lowered to a position below the top surface of the table 14 so that the blade can cut completely through the work piece during a cutting operation. The linear guide mechanism 20 has a pivot head 34 to which the shaft 28 is mounted and the pivot head 34 is connected to a pair of rods 36 that are slidable in a support frame 38 to provide a sliding action that extends the capacity of the saw. The combination of the support frame 38 pivoting about the table, and the table 14 pivoting about the base 12, gives the saw a compound cutting action. The support frame 38 has a bottom portion 40 that is attached to and is pivotable around a bevel pivot shaft (not shown) that is supported by a rear portion of the table 14.

From the foregoing it should be understood that the support frame 38 which carries the linear guide mechanism 20 as well as the blade and motor assembly 18 will pivot around the bevel pivot shaft for the purpose of orienting the blade 26 at the appropriate bevel angle for making bevel cuts on a work piece that may be placed on the table 14. The saw shown in FIG. 1 is in a neutral position where vertical cuts are made, assuming that the table 14 is in a horizontal position.

During operation, an operator places a work piece on the table 14, brings the handle 30 down into cutting position after activating the motor 22 and makes a chop cut on the work piece. However, if a sliding cut operation is needed for increased capacity, the operator will typically use the handle 30 to pull the blade and motor assembly forwardly to some forward position where the work piece will be engaged, activated the motor and bring the handle down into a cutting position, and then push the handle 30 toward the work piece to cut it.

Figure 3:
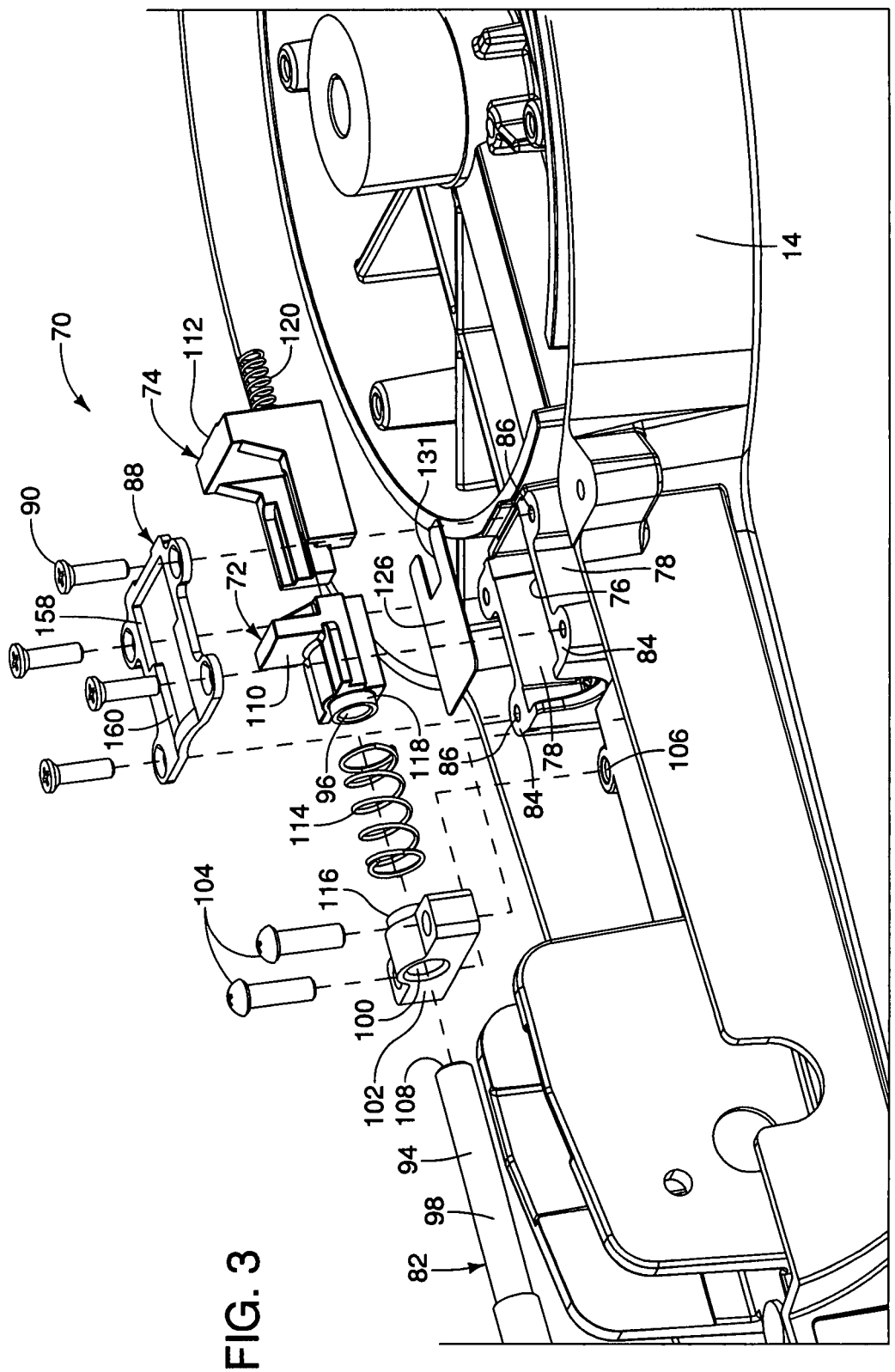
FIG. 3 is a view similar to FIG. 2, exploded to illustrate the components of the locking assembly.
Figure 4:
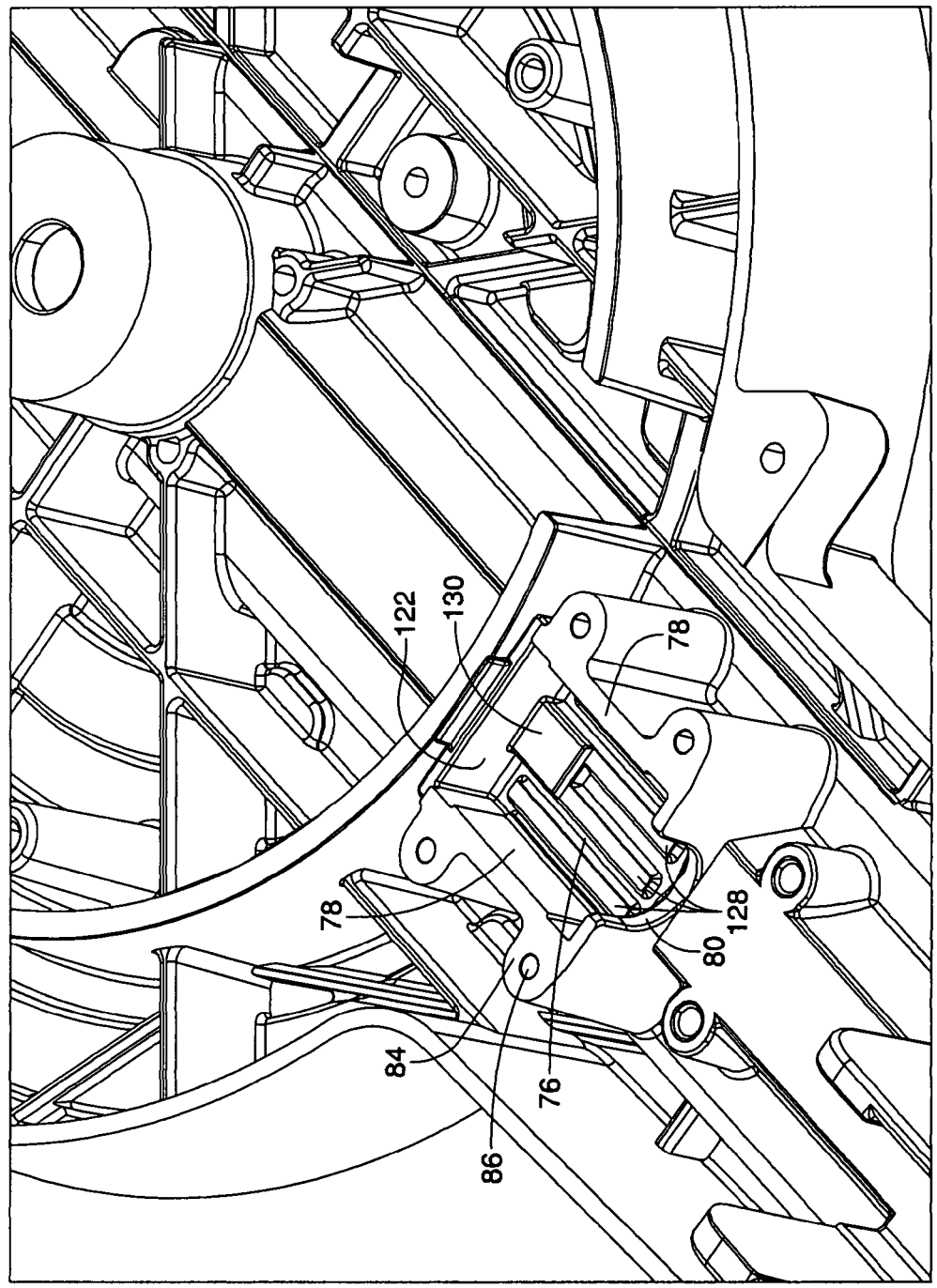
FIG. 4 is a perspective view similar to FIG. 3 with components removed to reveal other portions of the structure of the locking assembly.
Figure 5:
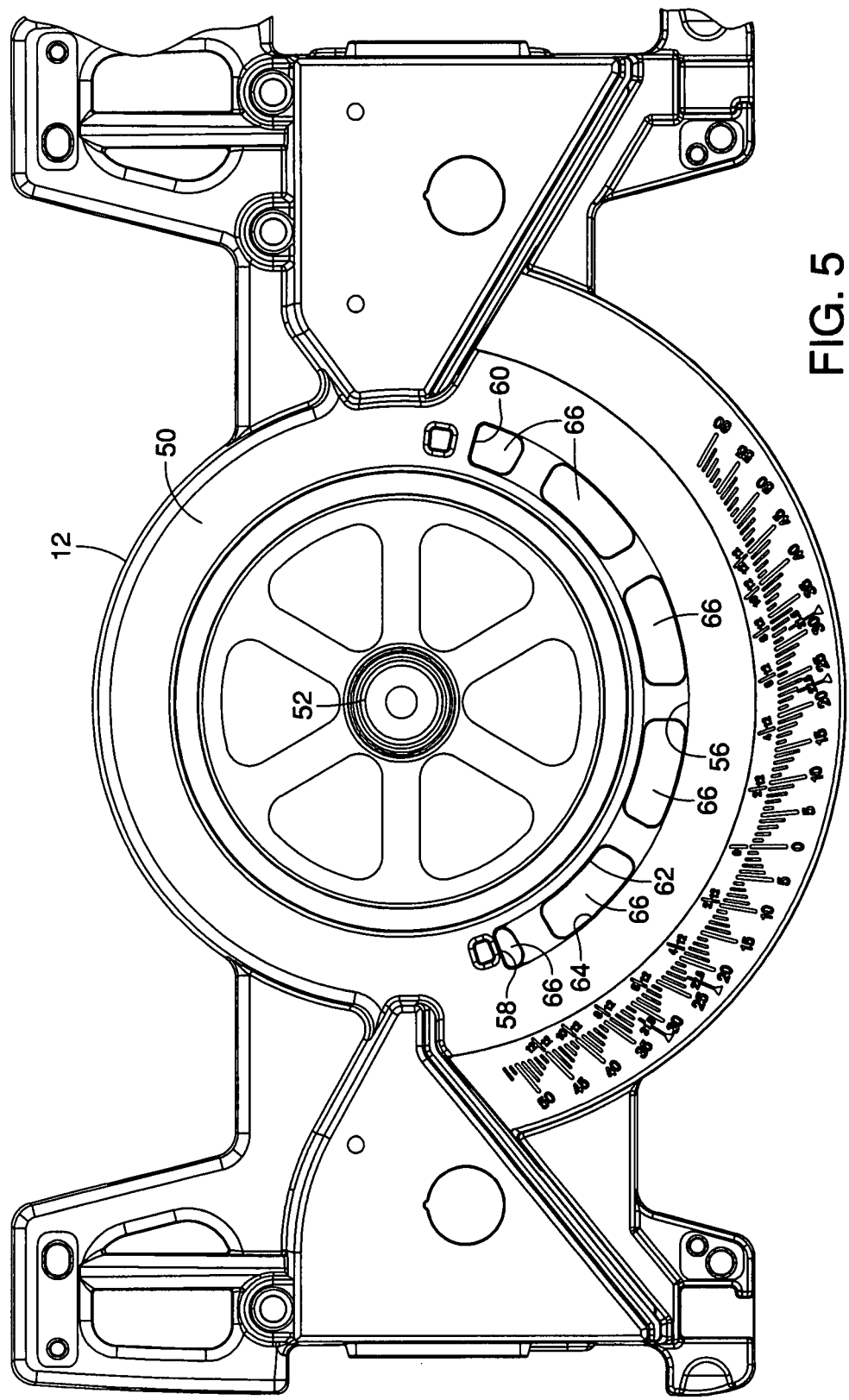
FIG. 5 is a plane view of the base of the miter saw shown in FIG. 1.

With regard to the first preferred embodiment of the locking assembly, it is generally shown in FIGS. 2-11, which illustrates the embodiment principally being attached to the table 14, that interacts with the base 12 shown in FIG. 5. The base has a generally semi-circularly shaped portion 50, which is substantially similar in size to the table 14, which is attached to the base portion and is rotatable about a center axis that is inserted into a center aperture 52, which receives a bolt structure (not shown), which fits within the aperture 52, as well as within a recess 54 in the bottom of the table 14 (see FIG. 2). The base 12 has an annular recess 56 that extends from a left end 58 to a right end 60, with the annular recess having a substantially constant width, and a depth of approximately ½ inch, thereby defining an inner locking surface 62 and an outer locking surface 64, against which the locking assembly may contact to provide locking engagement of the table 14 relative to the base 12. The base 12 also has several through openings 66. They are provided to enable saw dust and cuttings to be expelled from the recess, and thereby not to interfere with the operation of the locking assembly. It is of course understood that the inner and outer locking surfaces 62 and 64 are concentric with the aperture 52 that defines the center pivot axis of the table 14 relative to the base 12.

Figure 2:
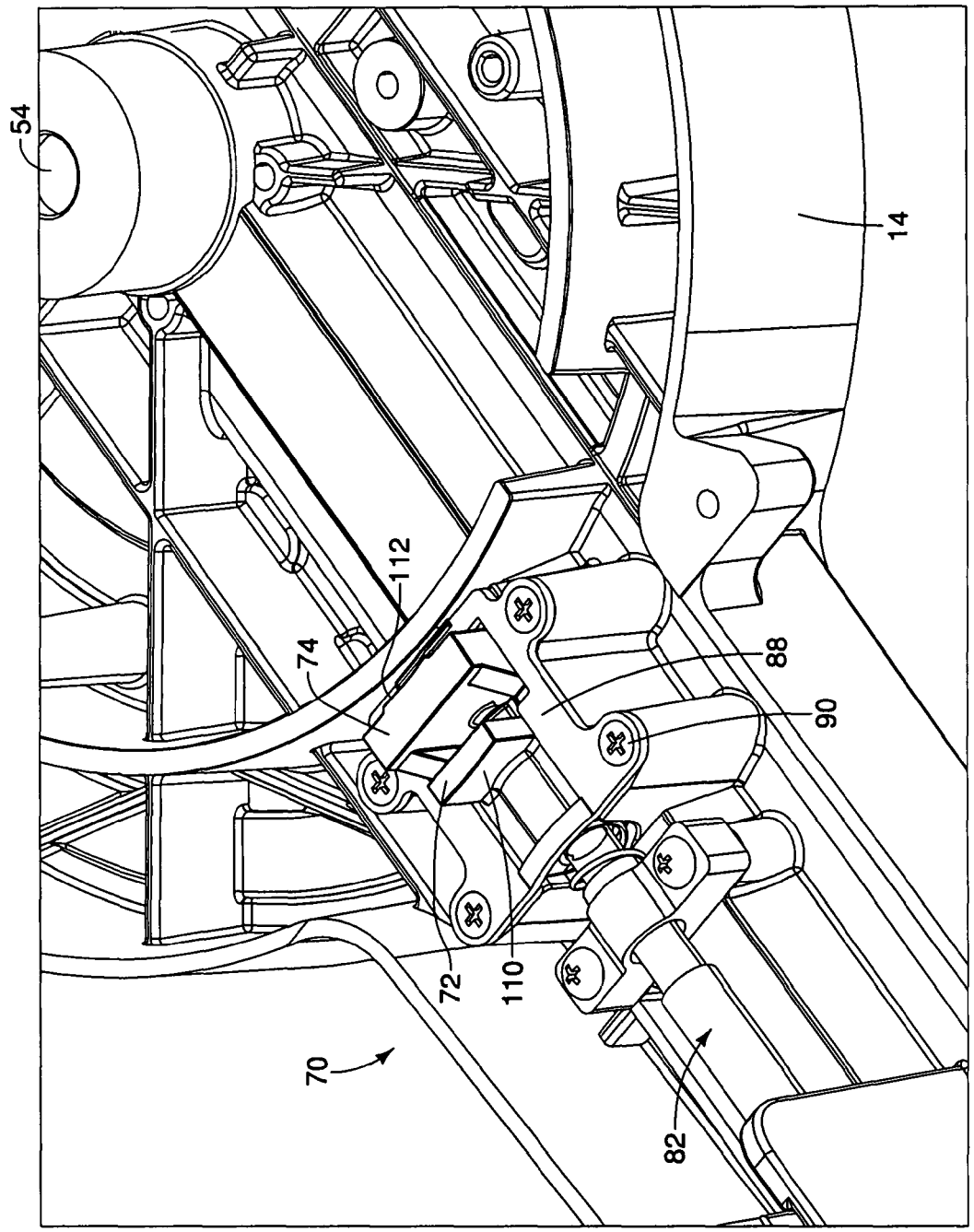
FIG. 2 is a perspective view of the underside of the table of the saw shown in FIG. 1, particularly illustrating the first preferred embodiment of the locking assembly of the present invention.

The locking assembly is indicated generally at 70, and is shown in FIGS. 2-3 in connection with the table 14, which is particularly configured to receive components of the assembly 70. Turning initially to FIGS. 2 and 3, the assembly 70 has a threaded jaw, indicated generally at 72, and an unthreaded jaw, indicated generally at 74, which fit within a chamber 76, having side walls 78 that are formed as a part of the table 14 that is preferably a metal casting. The chamber 76 is generally box-shaped, and has a front opening 80, through which a threaded rod, indicated generally at 82, may pass for engaging the threaded jaw 72. The side walls 78 have a flat top 84 with apertures 86 in enlarged end portions thereof. A cover plate 88 is attached to the side walls 78 by screws 90 that are inserted into the apertures 86.

The rod 82 is connected to a rotatable knob 92 that enables a user to engage and disengage the locking assembly for locking the table 14 in the desired position. The rod 82 has a threaded inner end portion 94 that is configured to engage a threaded aperture 96 of the threaded jaw 72. The threaded end portion 94 may not be threaded beyond that which is needed to cause the threaded jaw 72 to move through its movable range, and therefore, it may be smooth, i.e., unthreaded at 98. The smooth, unthreaded portion 98 may be in contact with the inside surface of an aperture 100, located in a bushing 102, that is secured to the table 14 by screws 104, that engage apertures 106. The bushing 102 thereby provides lateral support to the rotatable rod 82.

The general operation of the locking assembly shown in FIGS. 2 and 3, is that the rotation in the clockwise direction will cause the rod 82 to translate through the threaded aperture 96 of the threaded jaw 72 causing the end 108 to contact surface 146 (see FIG. 9) of unthreaded jaw 74. The threaded jaw 72 has a contact surface 110 that is designed to contact the outer locking surface 64 of the annular recess 56, and the unthreaded jaw 74 has a contact surface 112 that is positioned to abut the inner locking surface 62 of the base 12. Further turning of the rod will cause unthreaded jaw 74 to move to the right until surface 112 of the unthreaded jaw makes contact with locking surface 62 of the base 12. Further rotation of the rod 82 will cause the threaded jaw 72 to move to the left as viewed in FIG. 3 until the locking surface 110 of threaded jaw 72 makes contact with locking surface 64 of base 12. Further rotation of the rod 82 will cause the surfaces 110 and 112 to separate from one another into locking engagement with the inner and outer locking surfaces 62 and 64.

In this regard, the contact surfaces 110 and 112 are curved so that they have the same curvature as the locking surfaces 62 and 64. Thus, the surface 110 has a convex curvature corresponding to the curvature of the locking surface 64, and the contact surface 112 is concave to conform to the shape of the contact surface 62. As will be hereinafter explained, the threaded jaw 72 nests within a portion of the jaw 74, so that it is slidable relative thereto, and both jaws 72, 74 float within the annular recess 56 when they are not engaged.

Figure 6:
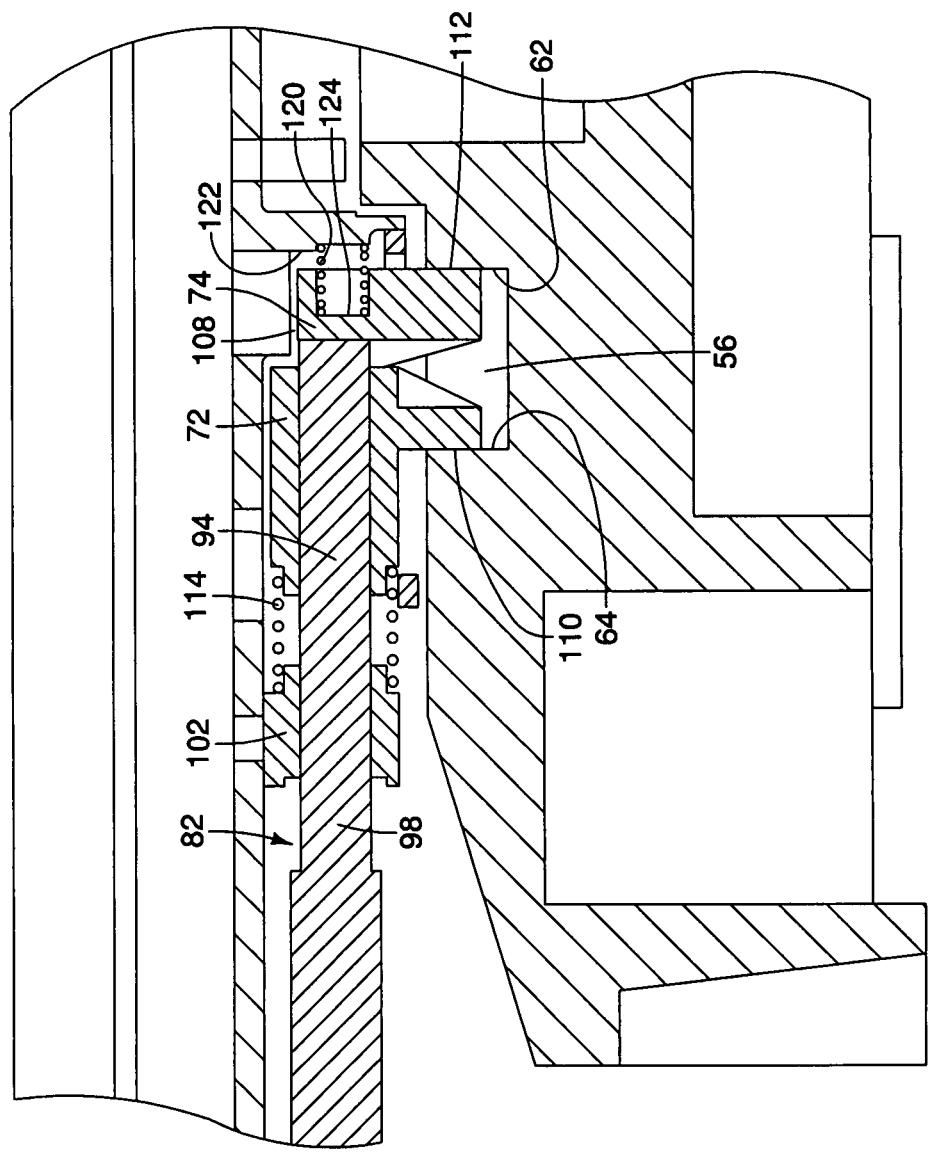
FIG. 6 is a cross-section of a portion of the base, table and the first preferred embodiment of the locking assembly shown in cross-section taken generally through the center of the threaded rod of the locking assembly.

Thus, the rod 82 is capable of axial movement, in addition to its rotation movement, so that the contact surfaces of the jaws tend to have equalized forces when they are moved into an engaged or locking position, as shown in FIG. 6. A spring 114 is provided, and it has a diameter slightly larger than the rod end 94, which fits inside of the spring. One end thereof also fits around a cylindrical boss 116, and the opposite end around another cylindrical boss 118, on the threaded jaw 72. Since the bushing 102 is stationary, the spring tends to push the threaded jaw 72 away from the bushing 102, which biases the threaded jaw 72 away from the outer locking surface 64 of the annular recess 56.

Similarly, a spring 120 is interposed between a wall 122 and an annular recess 124 in the right end of the unthreaded jaw 74, as best shown in FIG. 6. This tends to bias the jaw 74 to the left, as shown in FIGS. 3 and 6, and disengage the contact surface 112 from the inner locking surface 62 of the annular recess 56. Thus, when the threaded rod 82 is backed off, i.e., it is moved in the counter-clock-wise direction, the jaws 72 and 74 will be urged to maintain contact with one another, but will disengage the contact surfaces from the annular recess 56.

The jaws 72 and 74 are preferably made of steel, and the curved contact surfaces 110 and 112 are provided to conform to the shape of the annular recess 56, so that when the locking assembly is engaged to lock the table 14 to the base, the jaws will not deform the table, which is preferably an aluminum casting.

Since the jaws 72 and 74 slide within the table 76, a flat, steel wear plate 126 is provided to minimize wear that would otherwise be experienced by the table 14. Referring to FIG. 4, the bottom surface of the chamber 76 is provided with a plurality or raised ribs 128, as well as a raised square portion 130 that defines a stop for the jaw 72. The wear plate 126 has a cut-out portion 131 so that it can rest on the raised ribs 128.

Figure 8:
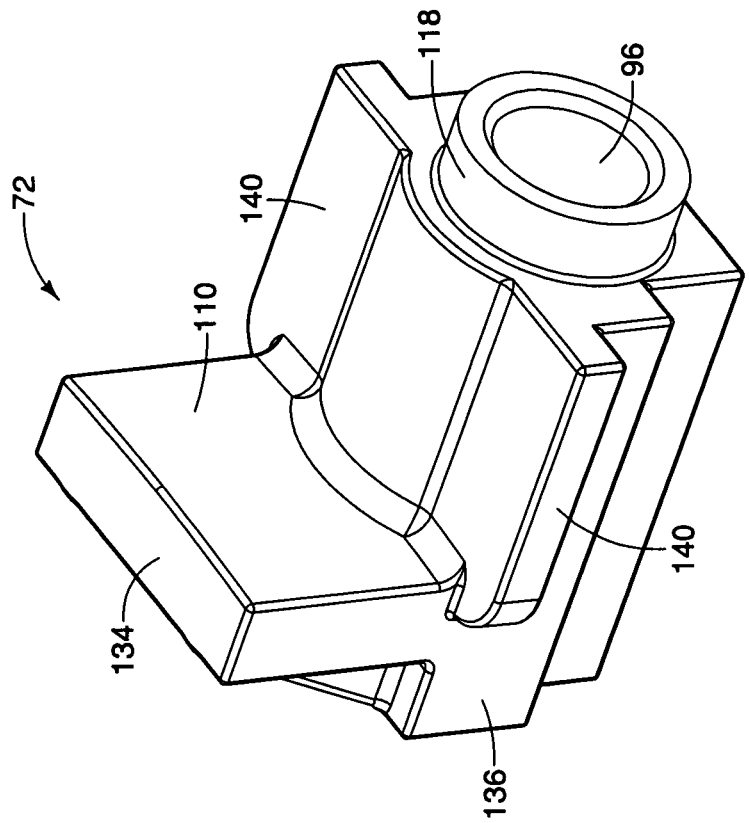
FIG. 8 is another perspective view of the threaded jaw portion of the first preferred embodiment of the locking assembly.
Figure 7:
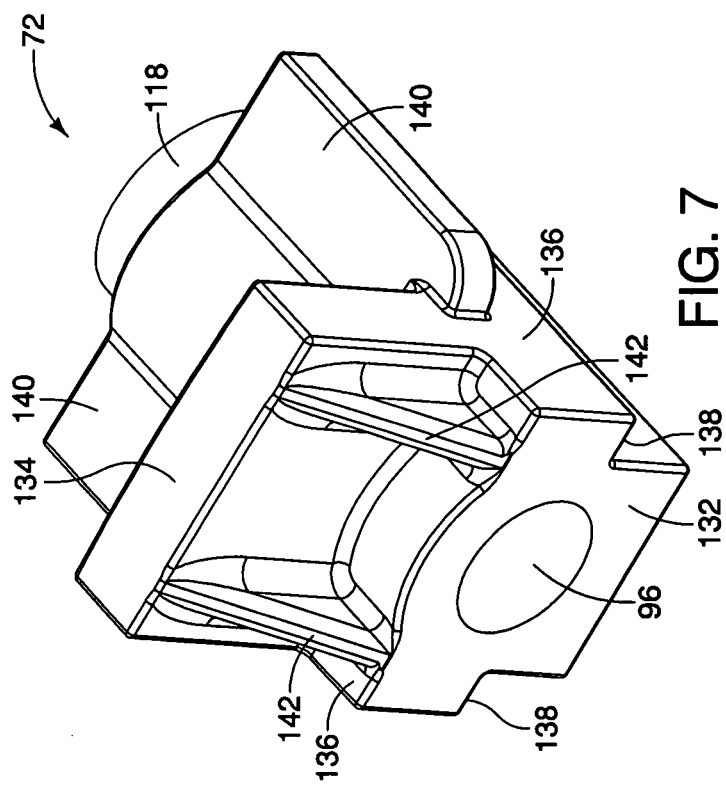
FIG. 7 is a perspective view of the back of the threaded jaw portion of the first preferred embodiment of the locking assembly.
Figure 11:
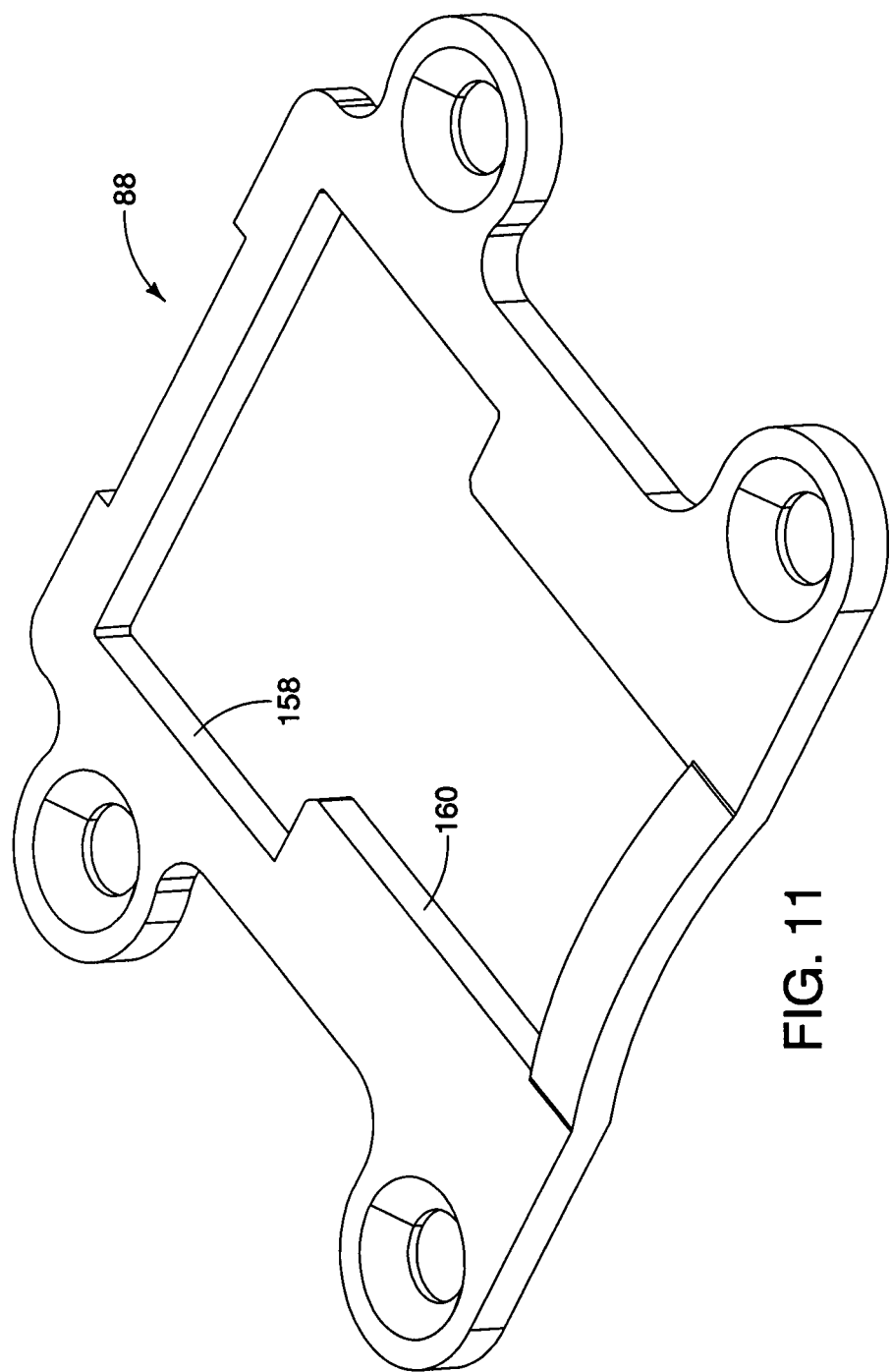
FIG. 11 is a perspective view of a retention plate of the first preferred embodiment of the locking assembly.

As is best shown in FIGS. 3, 7 and 8, the threaded jaw 72 has a lower base portion 132 from which a transverse upper portion 134 extends and which has the contact surface 110. The jaw 72 has side walls 136 that extend from the base portion upwardly to the upper portion and define the width of the jaw. The base portion 132 is formed with a pair of opposite horizontal shelves 138 as well as outwardly extending plane portions 140. The jaw 72 also has a pair of reinforcing ribs 142 for strengthening the upper portion 134.

Referring to FIGS. 3, 9 and 10, the unthreaded jaw 74 is shown and has a base portion 142 with an upper portion 144 that has the contact surface 112 in the outer face thereof. The annular recess 124 is provided in the contact surface 112 for receiving the spring 120. The interior vertical face 146 presents a surface for contact by the end 108 of the rod 82. The outer side walls 148 define the width of the jaw 74 and a central opening located between interior walls 150 has a width that is slightly larger than the raised square 130 in the bottom of the chamber 76. A lower shelf 152 is provided on each side of the opening and an upper shelf 154 is provided immediately adjacent to the shelf 152. The upper shelf 154 has a curved end portion 156 that has the cooperative shape to the flange 140 of the threaded jaw 72. As previously mentioned, the two jaws 72 and 74 nest together with one another and are also slidable with one another. The threaded rod 82 has an axis that extends through the aperture 100 of the bushing 102, the spring, the aperture 96 of the jaw 72, and the annular recess 124 in the jaw 74. Thus, the force is applied along this axis through these various components.

The top flange 140 of the jaw 72 slides on the upper shelf 154 of the jaw 74 and the shelves 138 of the jaw 72 slides on the lower shelf 152 of the jaw 74. The top flange 140 transfers the load from shelf 154 of the unthreaded jaw 74 to the threaded rod 82 rather than the cover plate 88 when the locking assembly is tightened to lock the table 14. Also, the end surface 108 of the threaded rod 82 contacts the lower part of the interior face 146 of the upper portion 144 and thereby minimizes the tipping moment that may be produced.

The cover plate 88 has a generally square shaped, larger cutout 158 that has a width corresponding to the distance between the side wall 148 and a narrower cutout 160 that is only slightly larger than the width between side walls 136 of the jaw 72. The cover plate 88 is provided to retain the jaws within the chamber, particularly during shipment of the miter saw.

Figure 12:
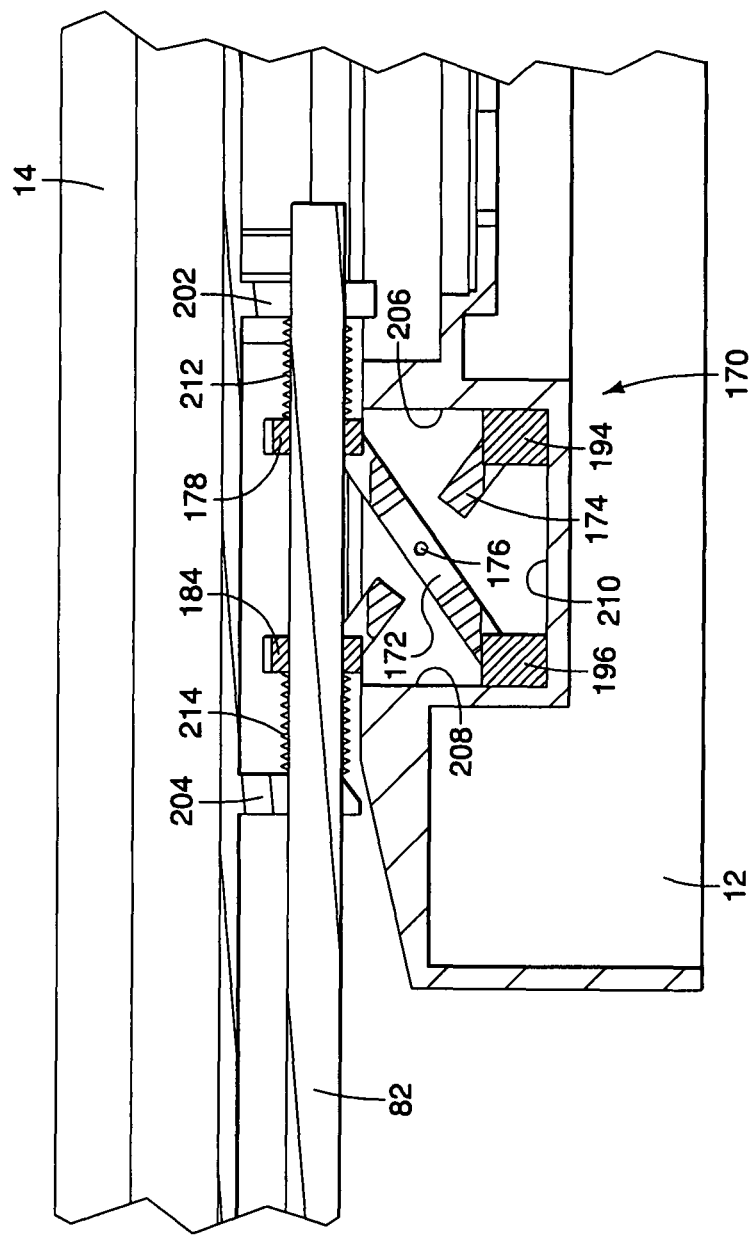
FIG. 12 is a cross-section of a second preferred embodiment of a locking assembly shown in its locked position.
Figure 13:
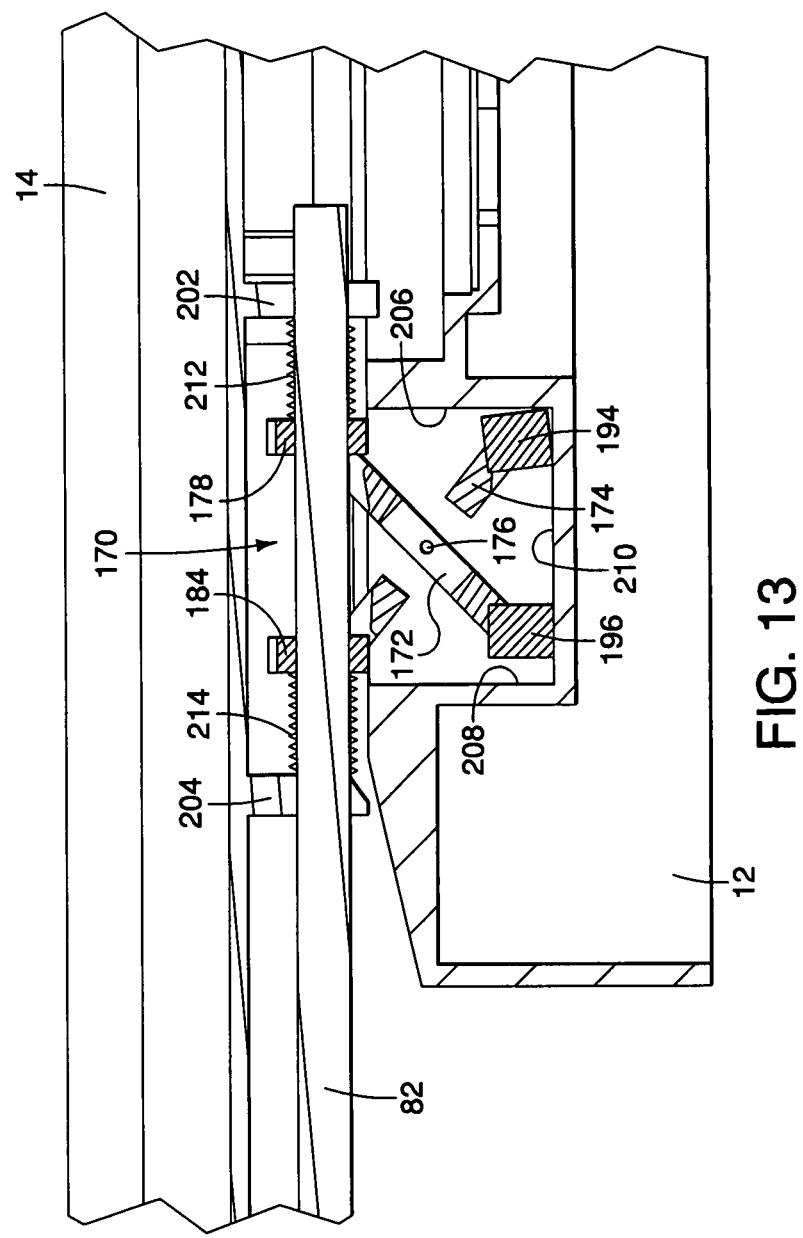
FIG. 13 is a cross-section of the second embodiment of a locking assembly shown in its unlocked position.
Figure 14:
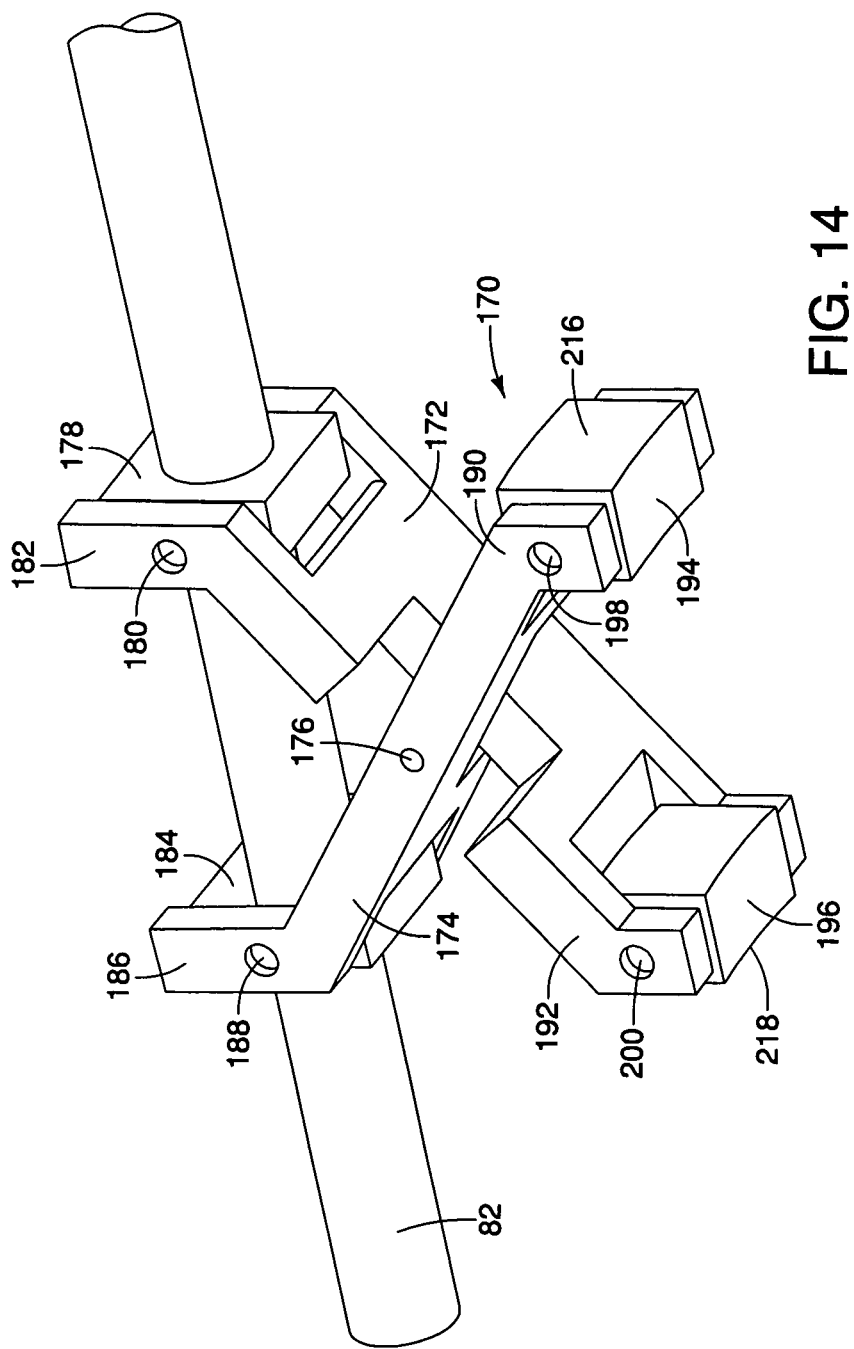
FIG. 14 is a perspective view of a portion of the mechanism shown in FIGS. 12 and 13.

A second preferred embodiment for locking the table to the base is shown in FIGS. 12-14, with this embodiment including a scissors mechanism, indicated generally at 170, and shown in perspective in FIG. 14 in diagrammatic form. The scissors mechanism 170 has a first clamp jaw 172 and a second clamp jaw 174 that are pivotally attached to one another by a pivot shaft 176. The top end of the clamp jaw 172 has a threaded nut 178 that is pivotally mounted on shaft 180 to an upper end 182 of the clamp jaw 172. Similarly, the second clamp jaw 174 has a pivotable nut 184 that is connected to an upper end 186 of the clamp jaw 174 by a shaft 188. Both of the nuts 178 and 184 engage threads on the locking rod 82 and the threads of the rod that engage the threads of the nut 184 are opposite to the threads on the rod portion that engages the nut 178. Thus, because of the opposite threads, rotation of the locking rod 82 in one direction will cause the nuts to move away from one another and in the opposite direction move toward one another. When the upper part ends 182 and 186 of the respective jaws 172 and 174 move toward one another, lower ends 190 and 192 move away from one another. These ends also have a respective clamp pads 194 and 196 that are respectively pivotally connected to lower ends 190 and 192 by shafts 198 and 200.

The scissor mechanism 170 is carried by the shaft 82, which as shown in FIGS. 12 and 13 is slidably mounted in transverse downward extensions 202 and 204 of the table 14. This enables the rod 82 to move in its axial direction so that the lower part of the scissors mechanism can adjust itself to equalize the forces applied to left and right vertical walls 206 and 208 of a clamp pocket 210 formed in the base 12. The axial position of the rod 82 is also centered by the presence of compression springs 212 and 214 that bear against one of the nuts 178 and 184 and the adjacent extension 202 and 204.

As shown in FIG. 13, the pads 194 and 196 are not engaged with the vertical walls of the pocket 210 whereas in FIG. 12, they are in a locking position. It should be also understood that the outer faces 216 and 218 of the pads are preferably curved to conform with the curvature of the pocket so that the major surface of the outer faces will be in contact with the associated vertical wall. In this regard, it should be understood that the pocket 210 is concentric with the axis of the table 14 as was the case for the first embodiment as shown in FIG. 5.

Figure 15:
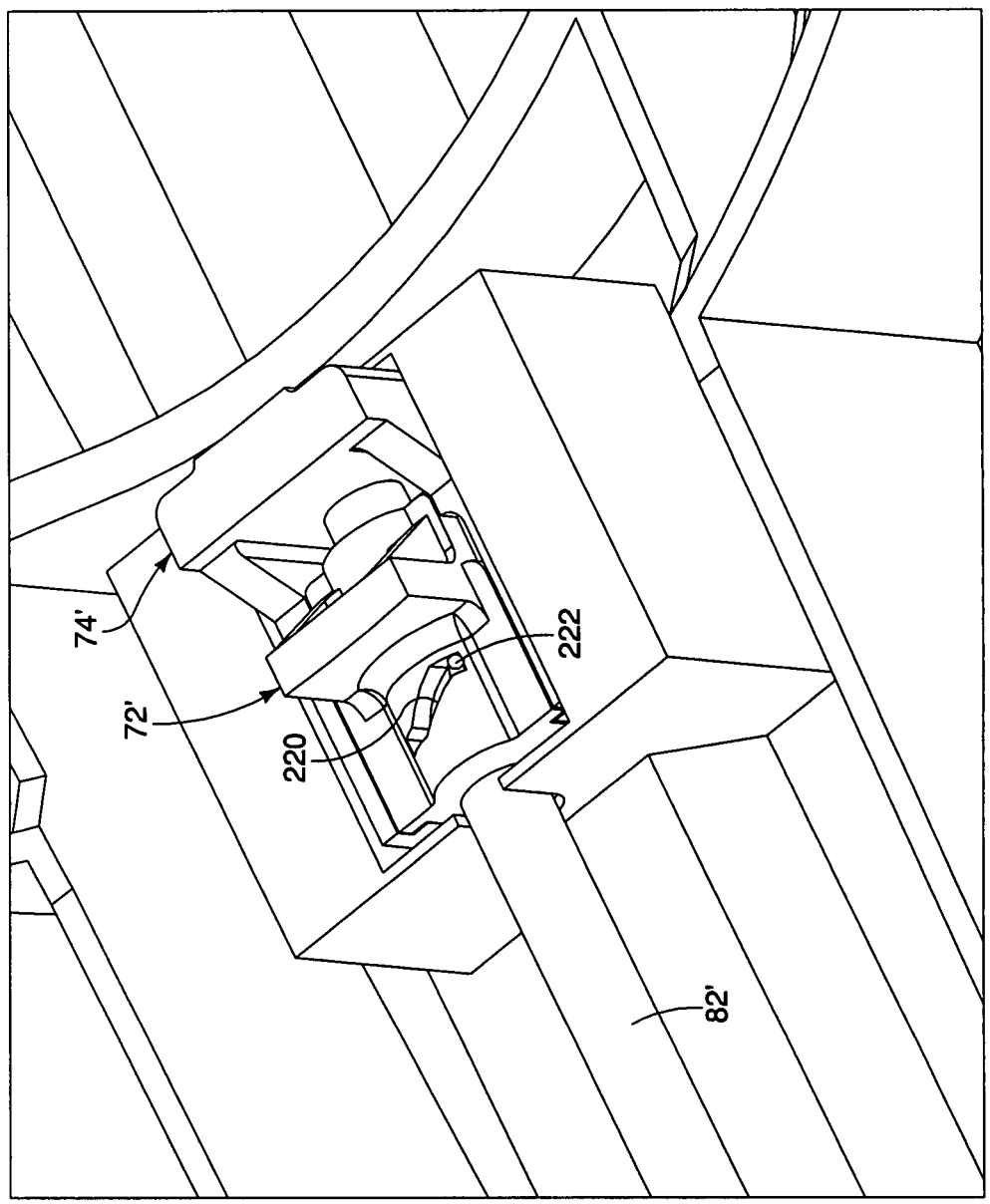
FIG. 15 is a perspective view of a portion of a third preferred embodiment of a locking assembly.
Figure 17:
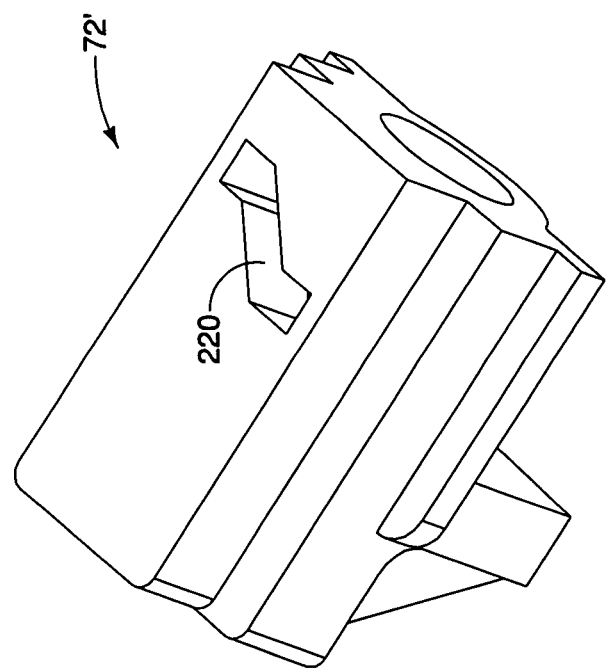
FIGS. 16 and 17 are perspective views of one of the locking jaws of the third embodiment shown in FIG. 15.
Figure 16:
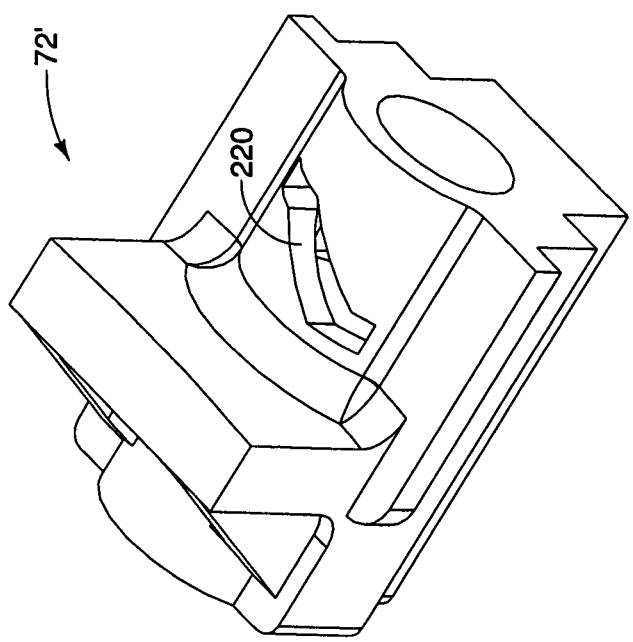

A third preferred embodiment of the present invention is shown in FIGS. 15, 16 and 17 wherein a threaded jaw 72' is shown to be substantially similar in its overall configuration except for the presence of opposed cam slots 220 which cooperate with a rod 82' which has at least one and preferably a pair of radially oriented pins 222 that engage the cam slots 220. Preferably, through the course of an approximate quarter turn, the rod 82' moves the threaded jaw 72 in the axial direction of the rod 82' between its locked and unlocked position. The amount of axial travel through the rotation of a quarter turn is a function of the angle of the slots 220 as is known to those of ordinary skill in the art. The angle can be determined to provide the correct amount of axial movement of the jaws 72' and 74' relative to one another to achieve the desired locking action. As with the first preferred embodiment shown in FIGS. 1-11, there is no appreciable force applied to the table in a radial direction when the table is locked to the base by the locking mechanism.

Figure 18:
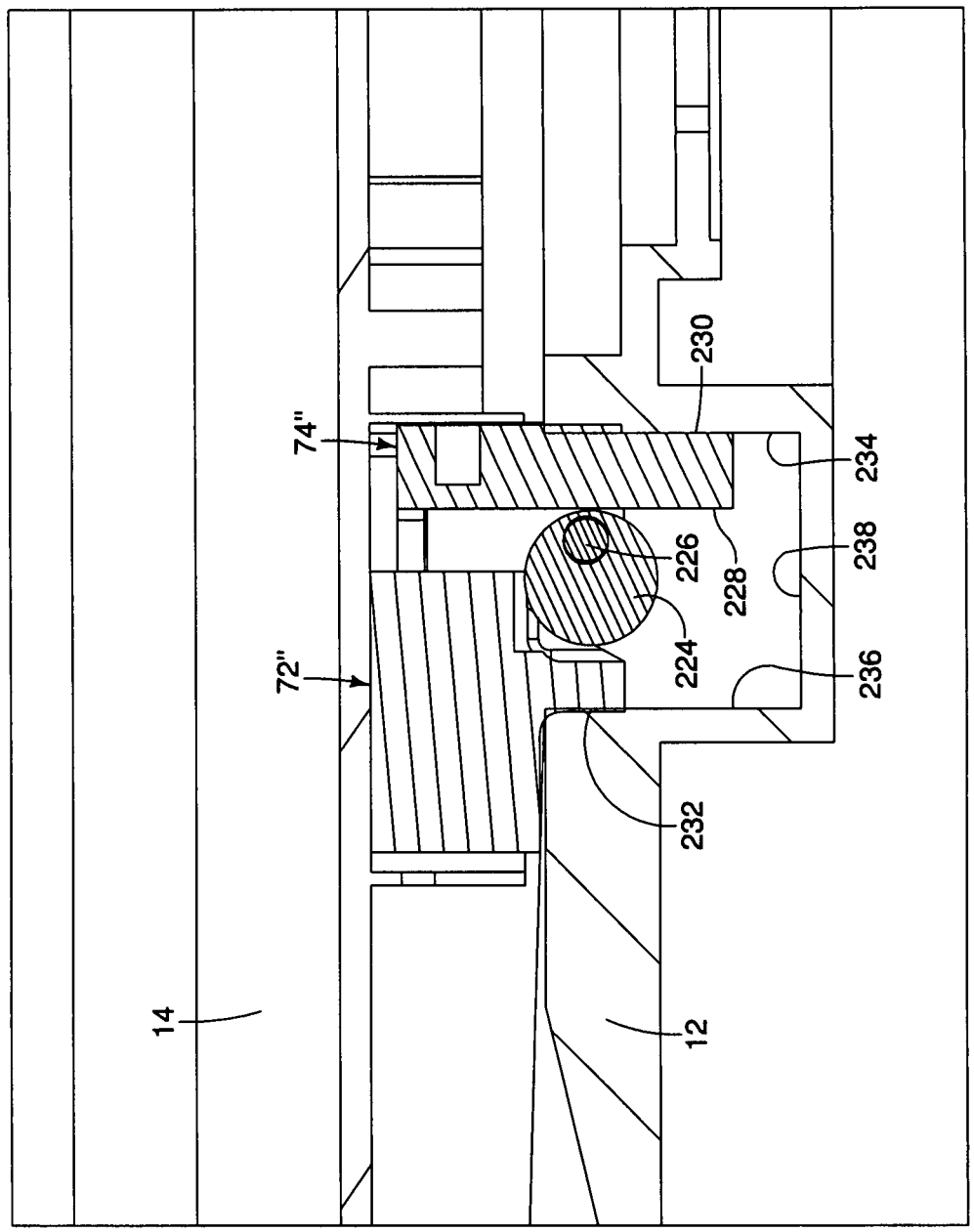
FIG. 18 is a side view, partially in section of a fourth preferred embodiment of a locking assembly.

Yet a fourth preferred embodiment is shown in FIG. 18 wherein a cam 224 is mounted to a rotatable shaft 226 that is preferably mounted to a connecting portion (not shown) that is a part of the jaw 72". The rotation of the shaft 226 and the cam 224 will cause the cam to contact surface 228 of the jaw 74" and cause the two jaws 72" and 74" to move away from each other so that their respective contact surfaces 230 and 232 will engage vertical surfaces 234 and 236 of a clamp pocket 238 and lock the table 14 to the base 12.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A locking assembly for a power miter saw of the type which has a base and a table that is rotatably mounted on the base about a center pivot axis, comprising:
   an arcuate recess having a pair of opposing arcuate surfaces formed in said base, said recess being spaced from and being concentric with a center pivot axis;
   a clamp having a pair of contact surfaces attached to said table for respectively engaging said pair of arcuate surfaces to lock the table from rotating relative to the base by applying a clamping force to said arcuate surfaces and not to the center pivot axis; and
   an actuating mechanism for operating said clamp,
   wherein said clamp has two clamping surfaces, each of which engage one of said arcuate surfaces when said clamp locks the table to the base, and
   wherein said clamping surfaces comprise a first clamping surface on a first jaw and a second clamping surface on a second jaw, said first and second jaws being movable in a generally radial direction relative to said arcuate surfaces and said pivot axis.

2. A locking assembly as defined in claim 1 wherein said first and second jaws are operatively coupled together and are located in a housing and configured to move therein and relative to one another in a radial direction relative to said pivot axis.

3. A locking assembly as defined in claim 1 further comprising a spring acting on each of said first and second jaws to bias the same out of contact with said arcuate surfaces.

4. A locking assembly as defined in claim 2 wherein said actuating mechanism comprises a threaded rod connected to said control knob at one end and that threadedly engages said first jaw and has an outer end that contacts said second jaw, whereby rotation of said rod in a first direction causes said jaws to separate from one another and to move toward one another when rotated in a second direction.

5. A locking assembly as defined in claim 4 wherein said first and second jaws are configured to nest together.

6. A locking assembly as defined in claim 5 wherein said first and second clamping surfaces face away from one another and engage opposite surfaces of said slot.

7. A locking assembly as defined in claim 5 wherein said clamping surfaces are curved to conform to the curvature of said arcuate surfaces.

8. A locking assembly for a power miter saw of the type which has a base, a table that is rotatably mounted on the base about a center pivot axis, and an elongated arm extending from the table for setting a miter angle for cutting a work piece placed on the table, comprising:
   an arcuate recess having a pair of opposing arcuate surfaces formed in said base, said recess being spaced from and being concentric with a center pivot axis;
   a clamp having a pair of contact surfaces attached to said table for respectively engaging said pair of arcuate surfaces to lock the table from rotating relative to the base by applying a clamping force to said arcuate surfaces and not to the center pivot axis; and
   an actuating mechanism operatively connected to said clamp for operating said clamp, said actuating mechanism including a rotatable control knob provided at a distal end of the elongated arm for controlling said operation of said clamp,
   wherein said clamp has two clamping surfaces, each of which engage one of said arcuate surfaces when said clamp locks the table to the base, and
   wherein said clamping surfaces comprise a first clamping surface on a first jaw and a second clamping surface on a second jaw, said first and second jaws being free to float in a generally radial direction relative to said arcuate surfaces and said pivot axis.

9. A locking assembly as defined in claim 8 wherein said first and second jaws are operatively coupled together and are located in a housing and configured to move therein and relative to one another in a radial direction relative to said pivot axis.

10. A locking assembly as defined in claim 8 further comprising a spring acting on each of said first and second jaws to bias the same out of contact with said arcuate surfaces.

11. A locking assembly as defined in claim 9 wherein said actuating mechanism comprises a threaded rod connected to said control knob at one end and that threadedly engages said first jaw and has an outer end that contacts said second jaw, whereby rotation of said rod in a first direction causes said jaws to separate from one another and to move toward one another when rotated in a second direction.

12. A locking assembly as defined in claim 11 wherein said first and second jaws are configured to nest together.

13. A locking assembly as defined in claim 12 wherein said first and second clamping surfaces face away from one another and engage opposite surfaces of said slot.

14. A locking assembly as defined in claim 12 wherein said clamping surfaces are curved to conform to the curvature of said arcuate surfaces.

15. A locking assembly as defined in claim 8 wherein said pair of opposing arcuate surfaces on said base are formed by a raised rib, and said clamping surfaces comprise a first clamping surface on a first end portion of a first arm and a second clamping surface on a first end portion of a second arm, a pivot connection pivotally connecting said first and second arms together intermediate each of their opposite end portions, said actuating mechanism comprising a threaded rod that threadedly engages the second end portion of each of said first and second arms, whereby rotation of said rod in a first direction causes said first and second clamping surfaces to move toward one another and to separate from one another when rotated in a second direction.

16. A locking assembly as defined in claim 8 wherein said pair of opposing arcuate surfaces on said base are formed by a raised rib, and said clamping surfaces comprise a first clamping surface on a first end portion of a first arm and a second clamping surface on a first end portion of a second arm, a pivot connection pivotally connecting said first and second arms together intermediate each of their opposite end portions, said actuating mechanism comprising a rod having a reduced diameter end portion defining a shoulder, said reduced diameter end portion passes through the second end portion of said first arm, said reduced diameter end portion having a threaded end that threadedly engages said second end portion of said second arm, and said pivot connection being slidable in a supporting slot oriented parallel to said rod, whereby rotation of said rod in a first direction causes said first and second clamping surfaces to move toward one another and to separate from one another when rotated in a second direction.

17. A locking assembly as defined in claim 8 wherein said first jaw has a cam pivotally mounted at an end adjacent said second jaw in close proximity to said second jaw and configured to move said jaws away from one another when said cam is pivoted in a first direction and to permit said jaws to move toward one another when said cam is pivoted in a second direction.

18. A locking assembly as defined in claim 17 further comprising a spring acting on each of said first and second jaws to bias said jaws toward one another.

19. A locking assembly as defined in claim 18 wherein said actuating mechanism comprises a slider crank linkage for selectively rotating said cam in said first and second directions.

20. A locking assembly as defined in claim 8 wherein said actuating mechanism comprises an elongated rotatable cylindrical rod extending through an opening in said first jaw, said rod having a cam following pin that extends beyond an outer surface of said rod, said jaw having a cam slot located therein in which said pin slides, said cam slot being configured to cause said rod to move in its axial direction when said rod is rotated, an outer end of said rod being configured to contact said second jaw, whereby rotation of said rod in a first direction causes said jaws to separate from one another and to move toward one another when rotated in a second direction.

21. A locking assembly as defined in claim 20 wherein said first jaw comprises a hollow cylindrical cam tube in which said rod is located, said cam slot being provided in the wall of said cam tube.

22. A locking assembly as defined in claim 21 wherein said cam slot is configured to enable a full range of axial movement of said rod by rotating said rod at less than a full rotation.

23. A locking assembly as defined in claim 22 wherein said full range of axial movement of said rod is carried out by rotating said rod approximately ¼ of a full rotation.

\* \* \* \* \*